(12) United States Patent
Oshita

(10) Patent No.: US 12,287,414 B2
(45) Date of Patent: Apr. 29, 2025

(54) MOBILE ELECTRONIC DEVICE, ELECTRONIC TIMEPIECE, DETERMINATION METHOD, AND METHOD OF SAVING POSITIONAL INFORMATION

(71) Applicant: CASIO COMPUTER CO., LTD., Tokyo (JP)

(72) Inventor: Yuuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/114,765

(22) Filed: Feb. 27, 2023

(65) Prior Publication Data

US 2023/0221449 A1 Jul. 13, 2023

Related U.S. Application Data

(62) Division of application No. 16/822,548, filed on Mar. 18, 2020, now Pat. No. 11,614,547.

(30) Foreign Application Priority Data

Mar. 25, 2019 (JP) ................... 2019-056180

(51) Int. Cl.
*G01S 19/47* (2010.01)
*G01S 19/45* (2010.01)
(Continued)

(52) U.S. Cl.
CPC .............. *G01S 19/47* (2013.01); *G01S 19/45* (2013.01); *G01S 19/37* (2013.01); *G01S 19/42* (2013.01); *G01S 19/48* (2013.01); *H04B 1/3827* (2013.01)

(58) Field of Classification Search
CPC .......... G01S 19/47; G01S 19/00; G01S 19/37; G01S 19/42; G01S 19/45; G01S 19/48; G01S 5/017; H04B 1/3827
(Continued)

(56) References Cited

U.S. PATENT DOCUMENTS 8,825,396 B2 9/2014 Scherzinger
9,019,156 B2 4/2015 Watanabe
(Continued)

FOREIGN PATENT DOCUMENTS

JP 2004-233058 A 8/2004
JP 2012-185570 A 9/2012
(Continued)

OTHER PUBLICATIONS

Japanese Office Action dated May 18, 2021 in a counterpart Japanese patent application No. 2019-056180. (Cited in the parent U.S. Appl. No. 16/822,548 and a machine translation (not reviewed for accuracy) attached.).
(Continued)

*Primary Examiner* — Chuong P Nguyen
(74) *Attorney, Agent, or Firm* — CHEN YOSHIMURA LLP

(57) ABSTRACT

A mobile electronic device including: a movement detection sensor; a positioning module; a processor; and a memory, wherein the processor determines whether the device is moving on the basis of a first tentative determination result obtained by determining whether the device is moving based on a value obtained from the movement detection sensor as well as a second tentative determination result obtained by determining whether the device is moving based on positional information detected by the positioning module, and,
(Continued)

upon determining that the device is moving, stores the positional information detected by the positioning module in the memory.

9 Claims, 10 Drawing Sheets

(51) Int. Cl.
*G01S 19/37* (2010.01)
*G01S 19/42* (2010.01)
*G01S 19/48* (2010.01)
*H04B 1/3827* (2015.01)

(58) Field of Classification Search
USPC ... 342/357.3, 357.2, 357.25, 357.28, 357.31, 342/357.77
See application file for complete search history.

(56) References Cited

U.S. PATENT DOCUMENTS

| | | | |
|---|---|---|---|
| 9,693,309 B2 * | 6/2017 | Tanabe | H04W 52/0254 |
| 9,823,356 B2 | 11/2017 | Sambongi | |
| 10,158,978 B1 | 12/2018 | Jantzi et al. | |
| 10,288,746 B2 * | 5/2019 | Ding | G08G 1/005 |
| 10,401,504 B2 * | 9/2019 | Sugiyama | G01S 19/34 |
| 10,527,736 B2 * | 1/2020 | Yan | G01C 21/005 |
| 10,866,326 B2 | 12/2020 | Matsue et al. | |
| 11,346,960 B2 * | 5/2022 | Yan | G01C 22/00 |
| 11,525,928 B2 * | 12/2022 | Imamura | H04B 1/3827 |
| 11,550,269 B2 * | 1/2023 | Oshita | G04R 20/02 |
| 11,561,514 B2 * | 1/2023 | Oshita | G04B 47/06 |
| 11,860,586 B2 * | 1/2024 | Oshita | G04F 10/00 |
| 2017/0372580 A1 | 12/2017 | Vivathana | |
| 2018/0356534 A1 * | 12/2018 | Sugiyama | G01S 19/49 |
| 2020/0309962 A1 | 10/2020 | Oshita | |
| 2020/0310362 A1 | 10/2020 | Oshita | |
| 2020/0319604 A1 | 10/2020 | Oshita et al. | |

FOREIGN PATENT DOCUMENTS

| | | | | |
|---|---|---|---|---|
| JP | 2013-160686 A | | 8/2013 | |
| JP | 2015-32857 A | | 2/2015 | |
| JP | 2015-102515 A | | 6/2015 | |
| JP | 2016-158118 A | | 9/2016 | |
| JP | 2017-116443 A | | 6/2017 | |
| JP | 2019109109 A | * | 7/2019 | G01S 19/49 |
| JP | 2020-159711 A | | 10/2020 | |
| KR | 20150075143 A | | 7/2015 | |

OTHER PUBLICATIONS

Japanese Office Action dated Nov. 30, 2021 in a counterpart Japanese patent application No. 2019-056180. (Cited in the parent U.S. Appl. No. 16/822,548 and a machine translation (not reviewed for accuracy) attached.).

Japanese Office Action dated Apr. 4, 2023 in a counterpart Japanese patent application No. 2022-057765. (A machine translation (not reviewed for accuracy) attached.).

* cited by examiner

|  | GPS determination result | | |
|---|---|---|---|
| Acceleration sensor determination result | Stationary | Moving | Indeterminate |
| Not moving | × (Stationary) | ○ (Moving) | × (Stationary) |
| Moving | × (Stationary) | ○ (Moving) | ○ (Moving) |

○ : Cancel any temporary suspensions  
× : Temporarily suspend

FIG. 4

| Acceleration sensor determination result | GPS determination result | | | ○: Cancel any temporary suspensions | ×: Temporarily suspend |
|---|---|---|---|---|---|
| Not moving | | | | × | |
| | | | | × | |
| | | | | × | |
| Moving | | | | ○ | |
| | | | | ○ | |
| | | | | ○ | |

FIG. 5

MOBILE ELECTRONIC DEVICE, ELECTRONIC TIMEPIECE, DETERMINATION METHOD, AND METHOD OF SAVING POSITIONAL INFORMATION

BACKGROUND OF THE INVENTION

Technical Field

The technical field relates to a mobile electronic device, an electronic timepiece, a determination method, and a method of saving positional information.

Background Art

In general, electronic timepieces have a small area in which components can be packaged, and as a result it is not possible to include high-capacity memory. Therefore, when recording information such as running records, conventional electronic timepieces use an acceleration sensor to perform a state determination and stop logging data when movement stops so as to reduce memory usage. In this way, conventional electronic timepieces prevent unavoidable interruptions in running records due to waiting at traffic signals or the like from being reflected in those running records.

Moreover, Japanese Patent Application Laid-Open Publication No. 2004-233058 discloses a technology in which information obtained from a magnetic direction sensor and an acceleration sensor is used to correct positional information received using a Global Positioning System (GPS) receiver.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a mobile electronic device including: a movement detection sensor; a positioning module; a processor; and a memory, wherein the processor determines whether the device is moving on the basis of a first tentative determination result obtained by determining whether the device is moving based on a value obtained from the movement detection sensor as well as a second tentative determination result obtained by determining whether the device is moving based on positional information detected by the positioning module, and, upon determining that the device is moving, stores the positional information detected by the positioning module in the memory.

In another aspect, the present disclosure provides a mobile electronic device, comprising: a positioning module that performs positioning of the mobile electronic device by receiving radio waves from navigation satellites; a movement detection sensor that detects movement of the electronic device without using the radio waves from navigation satellites; a processor; and a memory, wherein the processor executes a prescribed process on the basis of a first tentative determination result obtained by determining whether the mobile electronic device is moving based on a signal obtained from the movement detection sensor as well as a second tentative determination result obtained by determining whether the mobile electronic device is moving based on positional information detected by the positioning module.

In the above-described mobile electronic device, the processor may determine whether the mobile electronic device is moving or stationary on the basis of the first tentative determination result and the second tentative determination result as the prescribed process.

In the above-described mobile electronic device, the processor may determine whether to store the positional information detected by the positioning module in the memory on the basis of the first tentative determination result and the second tentative determination result as the prescribed process.

In another aspect, the present disclosure provides a mobile electronic device, comprising: a Global Positioning System (GPS) receiver that detects a current positional information of the mobile electronic device at prescribed time intervals; and a processor, wherein the processor is configured to perform the following: determining that whether or not the mobile electronic device is moving, and setting a flag indicating whether or not the mobile electronic device is moving every time said determination is made; determining whether the mobile electronic device is linearly moving; and storing the current positional information detected by the GPS receiver in a memory if the flag indicates that the mobile electronic device is moving when the GPS receiver detects the current positional information and if either a prescribed time has passed since a previous detection of the current positional information, or the mobile electronic device has been determined to be linearly moving for a time period longer than another prescribed time, and wherein the processor is configured not to store the current positional information detected by the GPS receiver in the memory even if the flag indicates that the mobile electronic device is moving when the GPS receiver detects the current positional information, if the prescribed time has not passed since the previous detection of the current positional information and if the mobile electronic device has not been determined to be linearly moving for a time period longer than said another prescribed time.

In another aspect, the present disclosure provides a method performed by the processor in the above-described mobile electronic device, including the above-enumerated processes.

It is to be understood that both the foregoing general description and the following detailed description are exemplary and explanatory, and are intended to provide further explanation of the invention as claimed.

BRIEF DESCRIPTION OF THE DRAWINGS

FIG. 4 is a table illustrating log saving determination results when using an acceleration sensor and GPS.

FIG. 5 is a table illustrating log saving determination results for when the GPS is stopped.

DETAILED DESCRIPTION OF EMBODIMENTS

Figure 1:
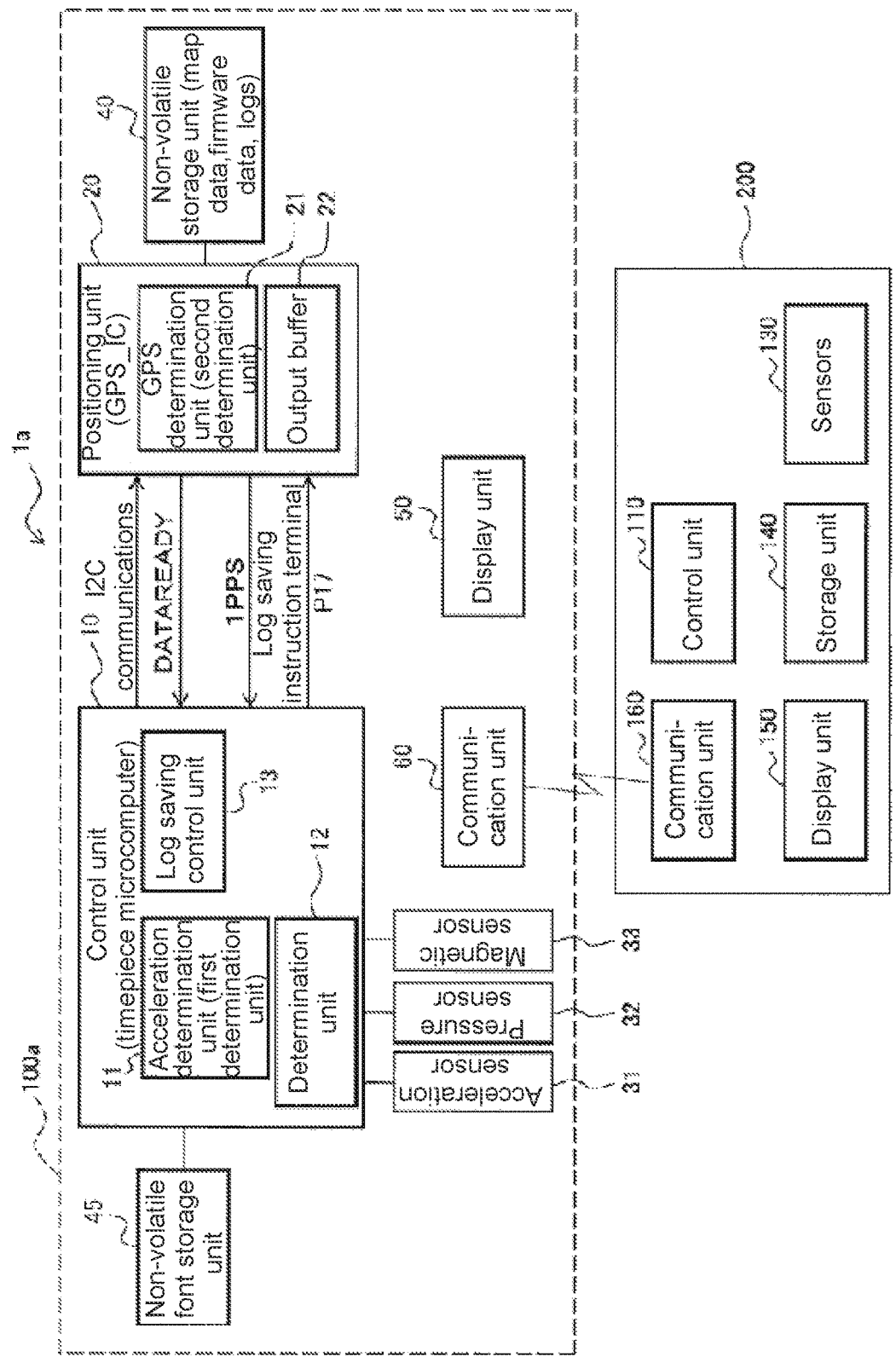
FIG. 1 is a block diagram of a mobile electronic device according to Embodiment 1 of the present invention.

Next, embodiments will be described in detail with reference to figures. Note that the figures are nothing more than schematic illustrations intended to facilitate sufficient understanding of these embodiments. Moreover, components that are shared and components that are similar are given the same reference characters in the figures, and redundant descriptions of such components will be omitted.

Embodiments

FIG. 1 is a block diagram of an instrumentation system used in a mobile electronic device according to the present embodiment.

A mobile device system 1a includes an electronic timepiece 100a (a mobile electronic device) and a mobile information device 200 which are connected so as to be able to communicate with one another. The electronic timepiece 100a has a feature for sequentially storing positional information associated with movement by way of walking or running as a log. The mobile information device 200 is a smartphone which has features for receiving this positional information from the electronic timepiece 100a and for displaying movement paths together with map information on a display unit 150.

The electronic timepiece 100a includes a processor 10; a GPS_IC 20 (positioning module); an acceleration sensor 31 (movement detection sensor); a pressure sensor 32; a magnetic sensor 33 (direction sensor); a non-volatile memory 40 which stores map data, firmware data, and logs; a non-volatile font memory 45; and a display unit 50. Here, the firmware data is a program for operating the GPS_IC 20.

The GPS_IC 20 (positioning module) receives positional information for the mobile electronic device itself from satellites. The GPS_IC 20 includes a GPS determination unit 21 (second determination unit) which has a feature for using the received positional information to determine whether the device is moving, stationary, or in some other indeterminate state. The GPS determination unit 21 also has a feature for using an angle calculated from the latitude and longitude between two points to determine whether the device is moving linearly. The GPS_IC 20 is connected to the non-volatile memory 40 and has an output buffer 22. Thus, the GPS_IC 20 has features for reading map data stored in the non-volatile memory 40 and for storing positional information in the non-volatile memory 40 as a log via the output buffer 22. In other words, the GPS_IC 20 has features for sequentially storing positional information in the internal output buffer 22 and for batch-storing this stored positional information in the non-volatile memory 40.

The acceleration sensor 31 detects accelerations to which the device itself is subjected. By calculating the magnitude and period of accelerations to which the device itself is subjected and comparing these to prescribed threshold values, the electronic timepiece 100a can determine whether the device is moving (as a result of walking, running, or the like) or not moving. Note that although in this embodiment the acceleration sensor 31 is used as the movement detection sensor, sensors that can be used for the movement detection sensor are not limited to this example. The movement detection sensor can be implemented using a sensor such as an inclination sensor or an angular velocity sensor or by using a plurality of sensors in combination. Furthermore, the pressure sensor 32 is a sensor which detects atmospheric pressure and is used to calculate altitude when hiking in the mountains or the like. The magnetic sensor 33 is a sensor which detects geomagnetism and is used to detect changes in the direction of movement by walking or running. Note that although in this embodiment the magnetic sensor 33 is used as the direction sensor, sensors that can be used for the direction sensor are not limited to this example. The direction sensor can be implemented using a sensor such as an inclination sensor or an angular velocity sensor or by using a plurality of sensors in combination.

In addition to storing fonts, the non-volatile font memory 45 stores time, pace, distance, laps, heart rate, pressure altitude, and the like as logged items. The display unit 50 is a liquid crystal display panel which displays time and positional information as numeric characters, for example. A communication unit 60 is connected to the mobile information device 200 via Bluetooth (registered trademark) so as to enable short-range wireless communications therebetween.

The processor 10 is a central processing unit (CPU) and executes programs stored in memory to implement the functions of an acceleration determination unit 11 (first determination unit), a determination unit 12, and a log saving processor 13. Moreover, by executing programs the processor 10 implements a determination method and a method of saving positional information. The acceleration determination unit 11 uses the acceleration sensor 31 to determine whether the device itself is moving (as a result of walking or running) or not moving. The determination unit 12 performs an overall determination of whether the device itself is moving on the basis of the determination results from the acceleration determination unit 11 (a first tentative determination result) and the determination results from the GPS determination unit 21 (a second tentative determination result). If the determination unit 12 makes an overall determination that the device is moving, the log saving processor 13 enters a "save logs" state, and if the determination unit 12 determines that the device is stationary, the log saving processor 13 enters a "do not save logs" state. In this way, the log saving processor 13 controls the GPS_IC 20 so as to reduce storage of logs (positional information) in the non-volatile memory 40. Furthermore, even when the overall determination yields "save logs", if the GPS determination unit 21 determines that the device is moving linearly, the log saving processor 13 reduces storage of logs (positional information).

The mobile information device 200 is a smartphone which includes a processor 110, various sensors 130, a memory 140, a display unit 150, and a communication unit 160. The processor 110 is a CPU and executes programs to batch-receive (or sequentially receive) the positional information (logs) stored in the non-volatile memory 40 by the electronic timepiece 100a via the communication unit 160 as well as to display the received positional information (movement paths) together with map information on the display unit 150. The sensor 130 is a GPS or acceleration sensor and receives positional information or detects gravitational force for use in determining the display orientation of the display unit 150. The display unit 150 is a touch panel display equipped with an input feature.

Figure 2:
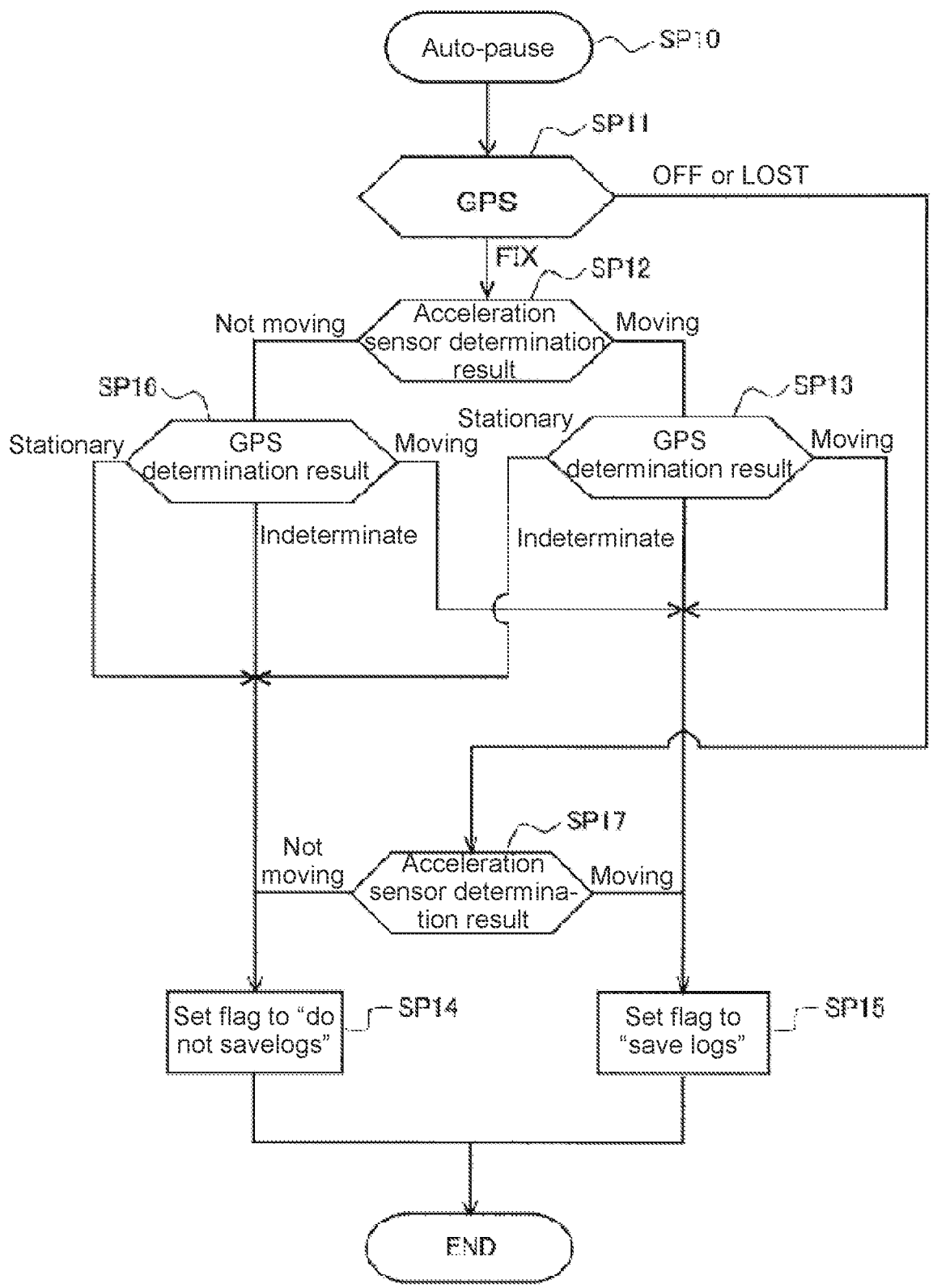
FIG. 2 is a flowchart for explaining a determination method used in making an overall determination of whether the device is moving.

FIG. 2 is a flowchart for explaining the determination method used in making the overall determination of whether the device is moving. This routine (SP10) is periodically executed by the determination unit 12 when the electronic timepiece 100a is in "traveling mode" or "exercise mode". Here, the acceleration determination unit 11 uses the acceleration sensor 31 to determine whether the device is moving.

The determination unit 12 determines whether the GPS_IC 20 is receiving radio waves and has a fix on positional information or whether the GPS_IC 20 was set to OFF or was otherwise not receiving radio waves (SP11). If a positional information fix has been obtained (FIX in SP11), the determination unit 12 determines whether an acceleration sensor determination result from the acceleration determination unit 11 is "moving" or "not moving" (S12). If the acceleration sensor determination result is "moving" (Moving in SP11), the determination unit 12 determines whether a GPS determination result from the GPS determination unit 21 is "moving", "stationary", or "indeterminate" (SP13).

If the GPS determination result is "stationary" (Stationary in SP13), the determination unit 12 sets a flag to "do not save logs" (SP14). Meanwhile, if the GPS determination result is "moving" (Moving in SP13), the determination unit 12 sets the flag to "save logs" (SP15). Moreover, even if the GPS determination result is "indeterminate", the determination unit 12 still sets the flag to "save logs" (SP15).

Meanwhile, if the acceleration sensor determination result (in SP12) is "not moving", the determination unit 12 determines whether the GPS determination result from the GPS determination unit 21 is "moving", "stationary", or "indeterminate" (SP16). If the GPS determination result is "stationary" (Stationary in SP16), the determination unit 12 sets the flag to "do not save logs" (SP14). Meanwhile, if the GPS determination result is "moving" (Moving in SP16), the determination unit 12 sets the flag to "save logs" (SP15). Moreover, if the GPS determination result is "indeterminate" (Indeterminate in SP16), the determination unit 12 sets the flag to "do not save logs" (SP14).

Here, if during the determination in SP11 the GPS_IC 20 was set to OFF or was otherwise not receiving radio waves ("OFF or LOST" in SP11), the determination unit 12 determines whether the acceleration sensor determination result from the acceleration determination unit 11 is "moving" or "not moving" (SP17). If the acceleration sensor determination result is "not moving" (Not moving in SP17), the determination unit 12 sets the flag to "do not save logs" (SP14). Meanwhile, if the acceleration sensor determination result is "moving" (Moving in SP17), the determination unit 12 sets the flag to "save logs" (SP15). Then, once the process of SP14 or SP15 has been completed, this routine ends.

Figure 3:
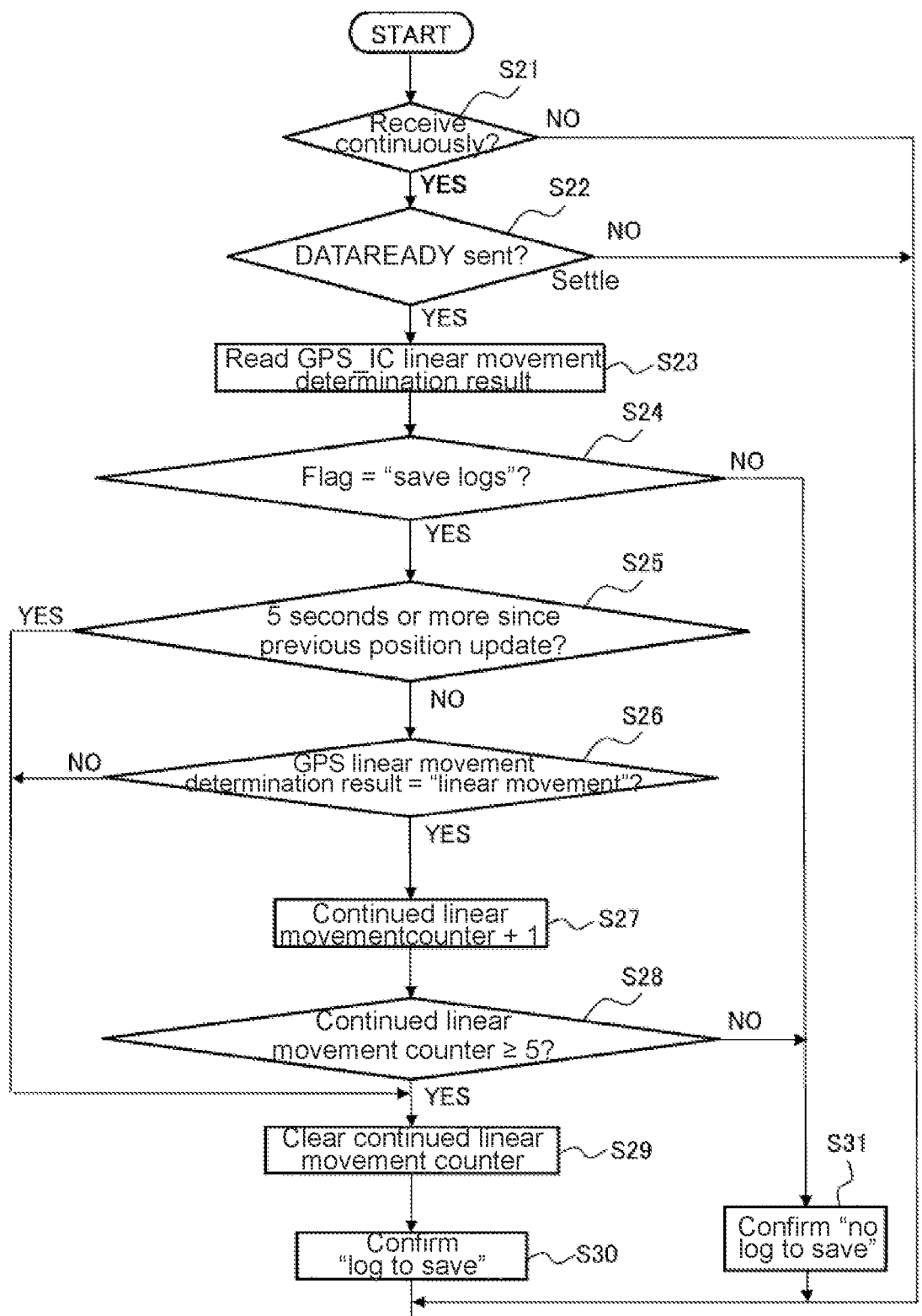
FIG. 3 is a flowchart for explaining a log saving control operation.

FIG. 3 is a flowchart for explaining a log saving control operation.

This routine (SP20) is periodically executed independently of the SP10 routine described above (FIG. 2).

The log saving processor 13 determines whether the device is set to "continuously receive" (S21). If the device is not set to "continuously receive" (NO in S21), the log saving processor 13 ends the process of this routine immediately. Here, when not set to "continuously receive", the device is set to "receive intermittently", which will be described in Embodiment 2.

If the device is set to "continuously receive" (YES in S21), the log saving processor 13 determines whether a DATAREADY signal that occurs when the position is updated has been sent (S22). If the DATAREADY signal has been sent (YES in S22), the log saving processor 13 reads a linear movement determination result from the GPS_IC 20 (S23). After the process of S23, the log saving processor 13 determines whether the flag set in the process of SP20 (FIG. 2) is set to "save logs" or is set to "do not save logs" (S24).

If the flag is set to "save logs" (YES in S24), the log saving processor 13 determines whether T seconds (where T=5 seconds, for example) or more have elapsed since the previous position update (S25).

If T=5 seconds or more have not elapsed since the previous position update (NO in S25), the log saving processor 13 determines whether the GPS linear movement determination result from the GPS_IC 20 is "linear movement" (S26). If the GPS linear movement determination result is "linear movement" (YES in S26), the log saving processor 13 adds 1 to a continued linear movement counter (S27). After S27, the log saving processor 13 determines whether the continued linear movement counter is greater than or equal to N (where N=5, for example) (S28). If the continued linear movement counter is greater than or equal to N=5 (YES in S28), the log saving processor 13 clears the continued linear movement counter (S29) and then confirms "log to save" (S30).

Meanwhile, if five seconds or more have elapsed since the previous position update (YES in S25) or if the GPS linear movement determination result is not "linear movement" (NO in S26), the log saving processor 13 clears the continued linear movement counter (S29) and then confirms "log to save" (S30).

Moreover, if the continued linear movement counter is less than N in the determination of S28 (NO in S28) or if the flag was "do not save logs" in the determination of S24 (NO in S24), the log saving processor 13 confirms "no log to save". Here, in this "no log to save" case, the processor 10 also prevents time, pace, distance, laps, heart rate, pressure altitude, and the like from being stored in the non-volatile font memory 45.

In other words, when T=5 seconds or more have elapsed or the GPS linear movement determination result is "linear movement" and the continued linear movement counter is greater than or equal to N=5, the log saving processor 13 confirms "log to save". Thus, even if linear movement continues, the log is only saved once per five times, and log saving is skipped for the other four times. Moreover, depending on the reception environment, position updates might not necessarily be received every second, and therefore if five seconds or more have elapsed since the previous position update, the log is saved instead of skipping the save. Then, if "log to save" has been confirmed, the log saving processor 13 makes the GPS_IC 20 save the log, and if "no log to save" has been confirmed, the log saving processor 13 does not make the GPS_IC 20 save the log.

FIG. 4 is a table illustrating log saving determination results when using an acceleration sensor and GPS.

The column direction gives the acceleration sensor determination results, and the row direction gives the GPS determination results. In other words, the column direction lists the "not moving" and "moving" determination results from the acceleration determination unit 11 (FIG. 1), and the row direction lists the "stationary", "moving", and "indeterminate" determination results from the GPS determination unit 21. Here, temporary suspensions in log saving are represented by X, and cancellation of temporary suspensions in log saving are represented by O.

When the acceleration sensor determination result is "not moving" (Not moving in S12 (FIG. 2)) and the GPS determination result is "stationary" (Stationary in SP16 (FIG. 2)), an overall determination that the device is "stationary" is made, and log saving is temporarily suspended (X). If the GPS determination result is "moving" (Moving in SP16), an overall determination that the device is also moving is made, and any temporary suspensions in log saving are canceled (O). When the GPS determination result is "indeterminate" (Indeterminate in SP16), log saving is temporarily suspended (X). In other words, when the acceleration sensor determination result is not moving and the GPS determination result are both "indeterminate", no logs are saved, which makes it possible to conserve memory.

Meanwhile, when the acceleration sensor determination result is "moving" (Moving in SP12) and the GPS determination result is "stationary" (Stationary in SP13), log saving is temporarily suspended (X). In other words, the GPS determination result of "moving" is prioritized over the acceleration sensor determination result of "stationary". Meanwhile, if the GPS determination result is "moving" (Moving in SP13), any temporary suspensions in log saving are canceled (O). Moreover, when the GPS determination result is "indeterminate" (Indeterminate in SP13 or SP16), depending on the acceleration sensor determination result, temporary suspensions in log saving are canceled (O), or the log saving is temporarily suspended (X).

FIG. 5 is a table illustrating log saving determination results for when the GPS is stopped.

In other words, this table illustrates log saving determination results for when the determination in SP11 of FIG. 2 yields "OFF or LOST".

Regardless of the GPS determination result, if the acceleration sensor determination result is "not moving", log saving is temporarily suspended (X), while if the acceleration sensor determination result is "moving", any temporary suspensions in log saving are canceled (O).

Figure 6:
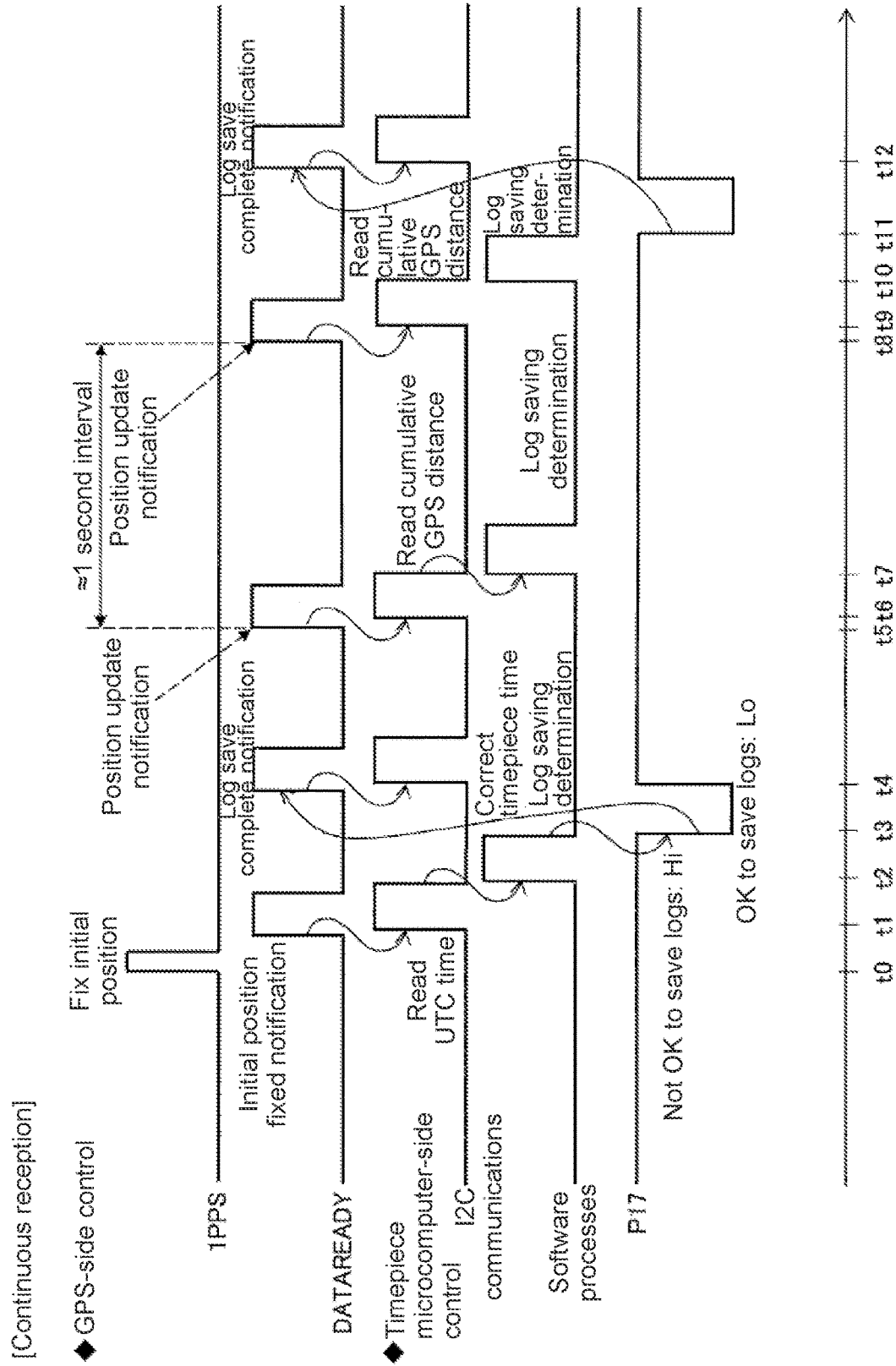
FIG. 6 is a timing chart for explaining the behavior of the mobile electronic device according to Embodiment 1 of the present invention.

FIG. 6 is a timing chart for explaining the behavior of the mobile electronic device according to Embodiment 1 of the present invention. Note that this timing chart is a timing chart for when the device is in "continuously receive" mode, in which the GPS_IC 20 is continuously operated at intervals of approximately one second. A "receive intermittently" mode, in which the GPS_IC 20 is operated intermittently in order to conserve power, will be described in Embodiment 2.

As illustrated in FIG. 1, the processor 10 and the GPS_IC 20 are connected via signal lines which transmit a plurality of signals (1PPS, DATAREADY, I2C communications, and a log saving instruction terminal P17). Here, the 1PPS signal and the DATAREADY signal are signals that are transmitted from the GPS_IC 20 to the processor 10, while the I2C communications and the log saving instruction terminal (P17) are signals that are transmitted from the processor 10 to the GPS_IC 20.

In other words, the 1PPS signal and the DATAREADY signal are signals that are output during GPS-side control, while the I2C communications and the log saving instruction terminal (P17) are signals that are issued during timepiece microcomputer-side control. Moreover, upon receiving the DATAREADY signal, the processor 10 uses an I2C communication to access a prescribed address in RAM and read what type of READY signal was sent. Here, if the log saving instruction terminal (P17) is set to "OK to save logs" (a LOW level) in the initial state, then logs would be saved as soon as an initial position is fixed even if the run has not yet started. Therefore, in the initial state (t<t3), this terminal is set to "Not OK to save logs" (a HIGH level) so that logs are saved when the initial position is fixed after the run starts.

At time t0, the GPS_IC 20 uses the 1PPS signal to notify the processor 10 that an initial position has been fixed, and at time t1, the GPS_IC 20 uses the DATAREADY signal to notify that the position has been updated. In other words, once an initial position has been fixed, the GPS_IC 20 uses the 1PPS signal and the DATAREADY signal to send an "initial position fixed" notification to the processor 10.

Moreover, once this "initial position fixed" notification is sent to the processor 10 via the DATAREADY signal at time t1, the processor 10 uses an I2C communication to read the Coordinated Universal Time (UTC) time at time t1. At time t2, upon finishing reading the UTC time the processor 10 executes a timepiece time correction process and a log saving determination process, and then at time t3 the processor 10 switches the log saving instruction terminal P17 from "Not OK to save logs" (the HIGH level) to "OK to save logs" (the LOW level).

At time t3, once the log saving instruction terminal P17 has been switched to "OK to save logs", the GPS_IC 20 stores the log that is currently stored in the output buffer 22 (FIG. 1) in the non-volatile memory 40 (FIG. 1). Then, at time t4, the GPS_IC 20 uses the DATAREADY signal to send a "log save complete" notification to the processor 10. The processor 10 responds to the DATAREADY signal by sending an I2C communication to the GPS_IC 20 to read the contents of the READY signal. Using these processes, the processor 10 determines whether to save logs based on the results of the GPS-side state determination and linear movement determination as well as on the result of the acceleration sensor 31 state determination performed by the processor 10. If the determination result is "save logs", then the processor 10 makes the log saving instruction terminal P17 transition to the LOW level. Moreover, the processor 10 stores a cumulative GPS distance read from the GPS_IC 20 and also instructs the GPS_IC 20 to save logs if this distance has reached a prescribed auto-lap distance.

When a position update occurs at time t5, for example, the GPS_IC 20 sends a "position update" notification to the processor 10 via the DATAREADY signal. At time t6, once the processor 10 receives this "position update" notification, the processor 10 uses an I2C communication to read the cumulative GPS distance. At time t7, upon completing the read of the cumulative GPS distance, the processor 10 performs a log saving determination. Here, if the result of the log saving determination indicates that logs should not be saved, for example, the processor 10 keeps the log saving instruction terminal P17 at "Not OK to save logs" (the HIGH level).

At time t8, which occurs after approximately one second has elapsed since time t5, the GPS_IC 20 once again uses the DATAREADY signal to send a "position update" notification to the processor 10. At time t9, upon receiving this "position update" notification, the processor 10 uses an I2C communication to read the cumulative GPS distance. At time t10, upon completing the read of the cumulative GPS distance, the processor 10 performs a log saving determination. At time t11, the processor 10 switches the log saving instruction terminal P17 from "Not OK to save logs" (the HIGH level) to "OK to save logs" (the LOW level). Next, the GPS_IC 20 saves the logs and then, at time t12, sends a "log save complete" notification to the processor 10.

Figure 7:
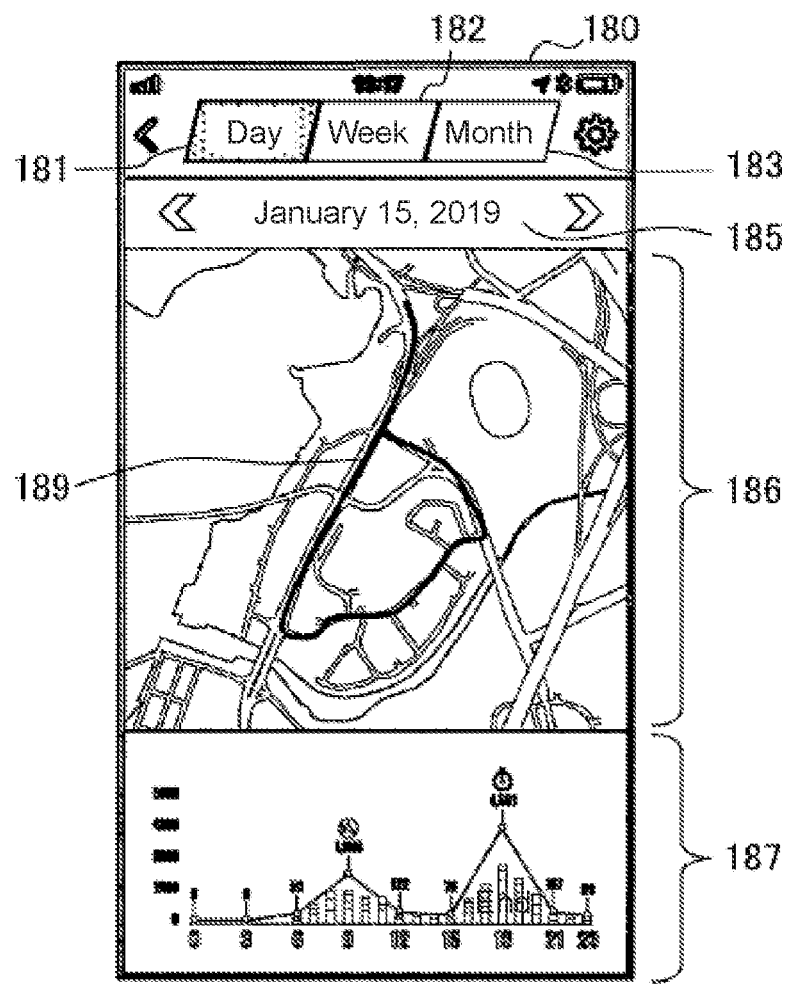
FIG. 7 is an example of a map screen which displays log results for when log recording is interrupted.
Figure 8:
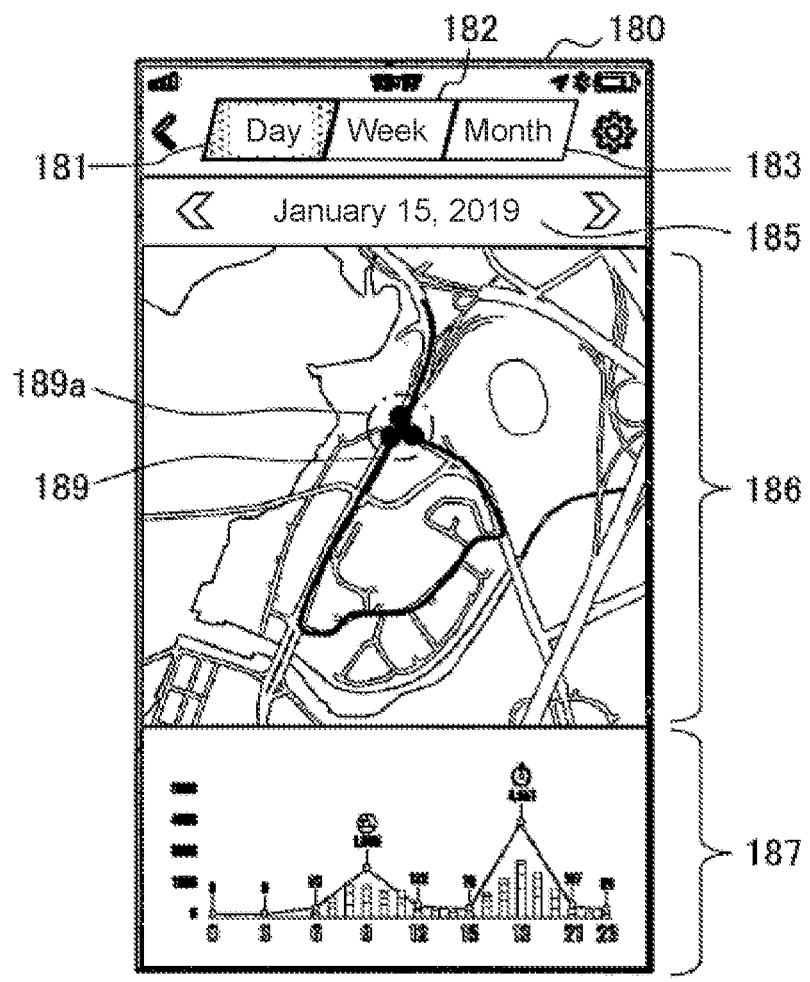
FIG. 8 is an example of a map screen which displays log results for when logs are continuously recorded.

FIG. 7 is an example of a map screen which displays log results for when log recording is interrupted, and FIG. 8 is an example of a map screen which displays log results for when logs are continuously recorded. FIGS. 7 and 8 are both screens which are displayed by the display unit 150 (FIG. 1) of the mobile information device 200. As illustrated in FIG. 8, when logs are continuously recorded without any interruptions in recording, a concentrated area 189a in which the walking or running path was concentrated in one location sometimes appears. However, as illustrated in FIG. 7, interrupting log recording makes it possible to avoid such concentration of paths.

Moreover, at the top of a map screen 180, a day selection button 181, a week selection button 182, and a month selection button 183 are arranged side by side. In FIGS. 7 and 8, the day selection button 181 is in a selected state, which indicates that the exercise data is being displayed on a per-day basis.

Beneath the day selection button 181, the week selection button 182, and the month selection button 183, a date field 185 is displayed. The date field 185 is a field which displays the dates of the currently selected time frame and here displays "January 15, 2019", for example.

A path 189 displayed in a map region 186 shows a history of logs (positional information) that has been stored by the electronic timepiece 100a superimposed on a two-dimensional map. A graph 187 shows a history of the user's step count information sorted by exercise intensity.

As described above, the acceleration determination unit 11 of the electronic timepiece 100a of the present embodiment determines whether the device is "moving" or in some other "not moving" state, and the GPS determination unit 21 determines whether the device is "moving", "stationary", or in some other "indeterminate" state. In general, when the GPS determination unit 21 makes a determination of "stationary", the determination unit 12 determines that the device (the electronic timepiece 100a) is "stationary" regardless of the determination result from the acceleration determination unit 11. Then, the log saving processor 13 temporarily suspends saving of logs. Furthermore, when the GPS determination unit 21 makes a determination of "moving", the determination unit 12 determines that the device is "moving" regardless of the determination performed by the acceleration determination unit 11. Then, the log saving processor 13 cancels any temporary suspensions on log saving. In addition, even when the GPS determination unit 21 makes a determination of "stationary", the log saving processor 13 only saves logs once per T seconds (five seconds, for example) or once per N times (five times, for example), thereby cutting down on log saves.

Moreover, even when the GPS determination unit 21 makes a determination of "indeterminate", if the acceleration determination unit 11 makes a determination of "moving", the determination unit 12 determines that the device is "moving". In this way, the determination unit 12 makes a determination of "stationary" for any halts in movement while waiting for traffic signals and makes a determination of "moving" when traveling by bicycle or by automobile or the like. Furthermore, when operated with the GPS_IC 20 set to OFF, the determination unit 12 performs a state determination based only on the determination result from the acceleration determination unit 11.

Embodiment 2

Although Embodiment 1 as described above utilizes continuous reception in which GPS signals are continuously received at an interval of approximately one second, intermittent reception in which the GPS signals are received intermittently can also be used. Moreover, although in Embodiment 1 as described above logs and map data and firmware data are all stored in the single non-volatile memory 40, a non-volatile log memory and a non-volatile map memory can be separate.

Figure 9:
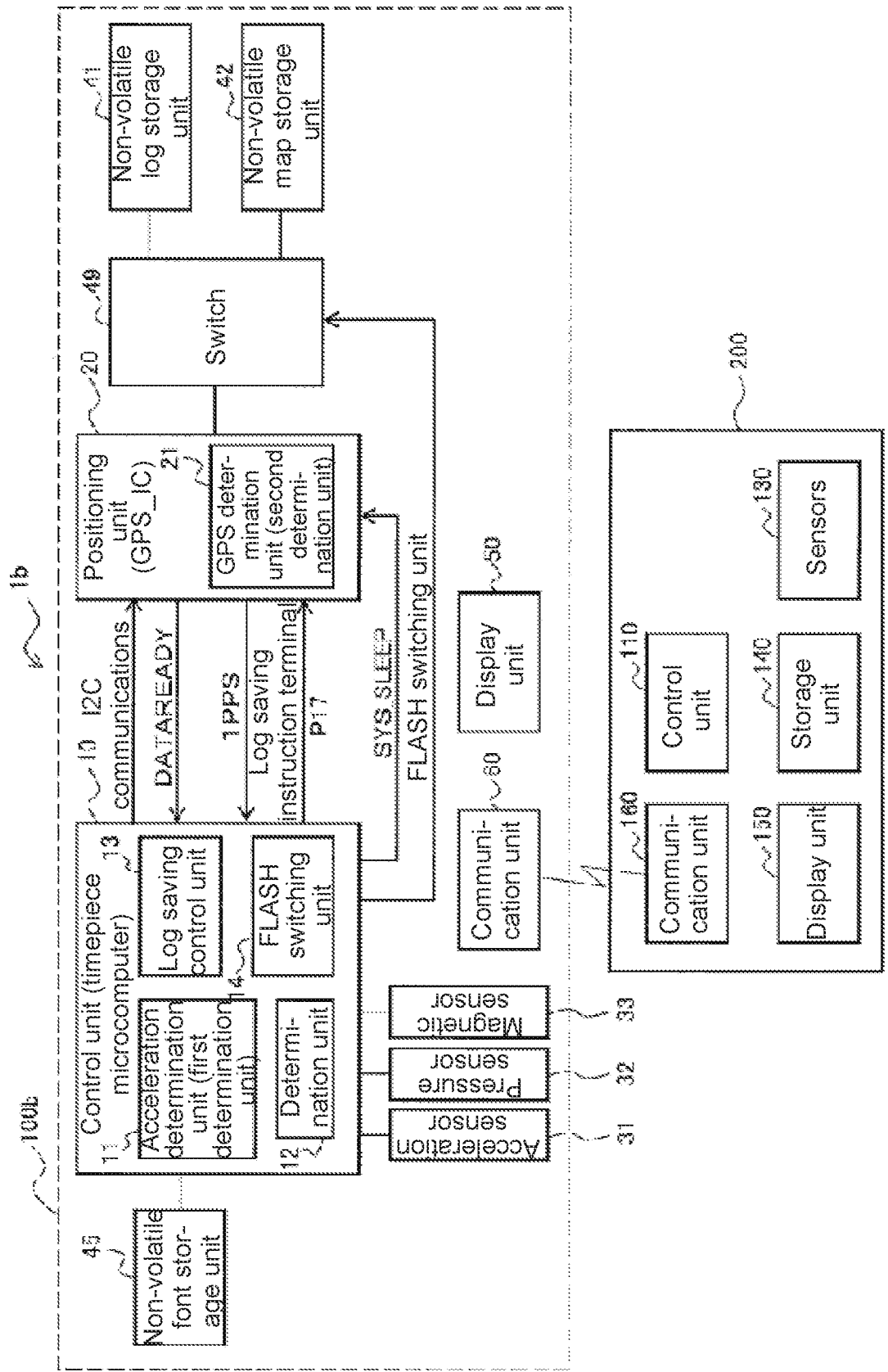
FIG. 9 is a block diagram of a mobile electronic device according to Embodiment 2 of the present invention.

FIG. 9 is a block diagram of a mobile electronic device according to Embodiment 2 of the present invention.

A mobile device system 1b includes an electronic timepiece 100b (a mobile electronic device) and a mobile information device 200. The mobile information device 200 has the same configuration as the mobile information device 200 of Embodiment 1 as described above. Below, the ways in which the electronic timepiece 100b differs from the electronic timepiece 100a of Embodiment 1 will be described.

Between the processor 10 and the GPS_IC 20, a signal line that transmits a SYS_SLEEP signal from the processor 10 to the GPS_IC 20 is added. Moreover, in the electronic timepiece 100b a switch 49, a non-volatile log memory 41, and a non-volatile map memory 42 are connected to the GPS_IC 20 instead of the non-volatile memory 40 (FIG. 1). Furthermore, in the electronic timepiece 100b a FLASH switching terminal is connected between the processor 10 and the switch 49. Note here that the SYS_SLEEP signal and the combination of the switch 49, the non-volatile log memory 41, and the non-volatile map memory 42 are independent of one another. A signal line that transmits a SYS_SLEEP signal may be added, and a non-volatile memory 40 may be included instead of the switch 49, the non-volatile log memory 41, and the non-volatile map memory 42.

The SYS_SLEEP signal is a suspension signal which suspends the GPS_IC 20. In this way, the processor 10 can make the GPS_IC 20 receive intermittently. The non-volatile log memory 41 is a Flash ROM which stores logs. The non-volatile map memory 42 is a Flash ROM which stores map data and firmware data. The switch 49 switches the data bus for the GPS_IC 20 between the non-volatile log memory 41 and the non-volatile map memory 42. The FLASH switching terminal is a terminal via which the processor 10 controls the switch 49.

Note here that the acceleration sensor 31, the pressure sensor 32, and the magnetic sensor 33 are connected to the processor 10 and are not connected to the GPS_IC 20. Therefore, even when receiving intermittently (that is, even when the GPS_IC 20 is suspended), pace (the period of the acceleration sensor), atmospheric pressure/altitude, and direction can be constantly displayed on the display unit 50.

Figure 10:
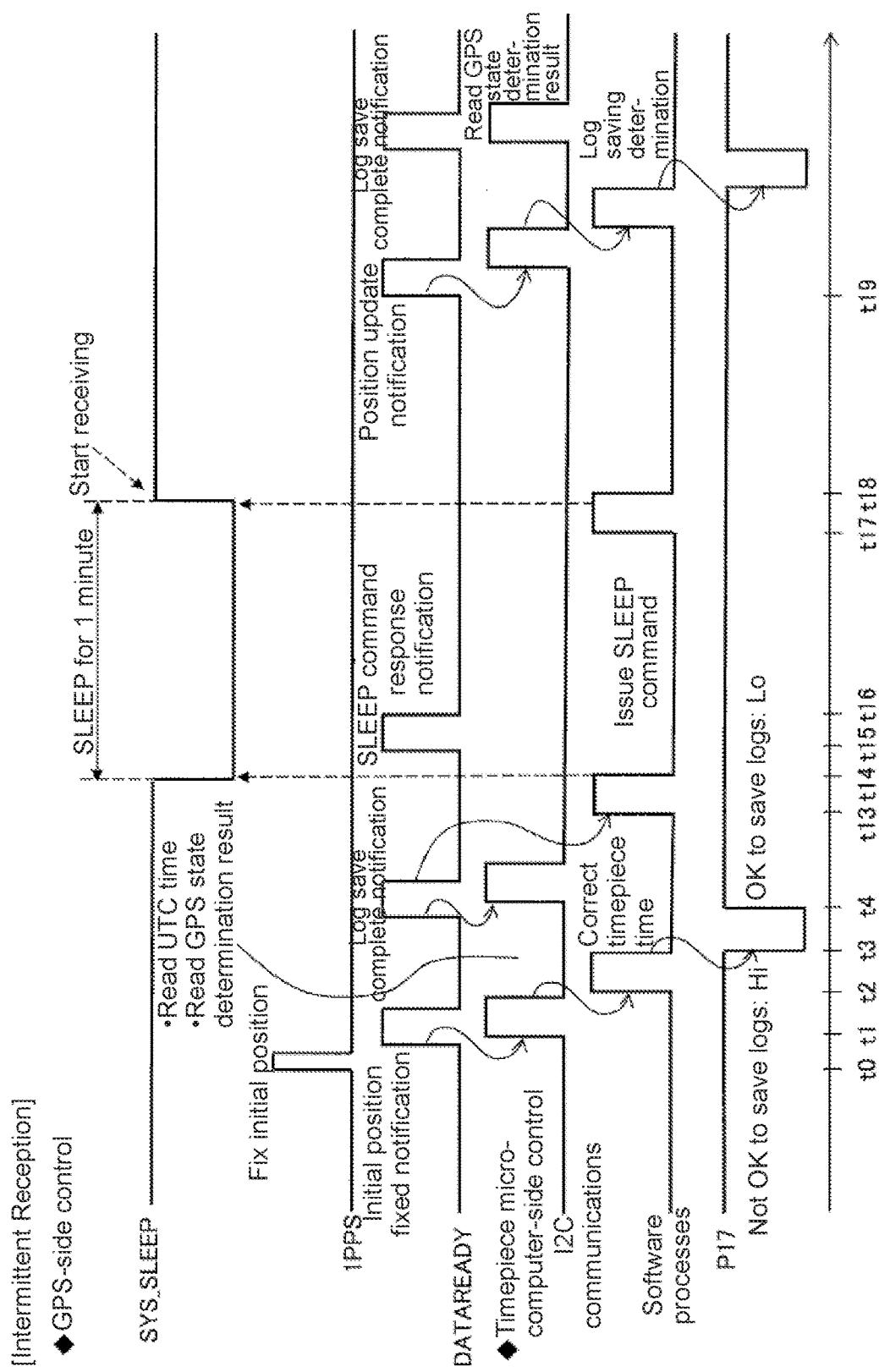
FIG. 10 is a timing chart for intermittent reception.

FIG. 10 is a timing chart for intermittent reception.

The differences from the timing chart for continuous reception in Embodiment 1 as described above (FIG. 6) are that the SYS_SLEEP signal is added and that the GPS_IC 20 sends a "SLEEP command response" notification instead of sending a "position update" notification via the DATAREADY signal (FIG. 6). Note also that FIG. 6 shows times t0 to t12. FIG. 10 shows times t0 to t4 (which are the same as in FIG. 6) as well as times t13 to t19.

The SYS_SLEEP signal is a signal which causes the GPS_IC 20 to receive GPS signals when at a HIGH level and causes this receipt to be suspended when at a LOW level. In the present embodiment, after the "log save complete" notification at time t4, at time t13 the processor 10 issues a SLEEP command and then sets the SYS_SLEEP signal to the LOW level for one minute (t14). Upon detecting that the SYS_SLEEP signal has transitioned to the LOW level, the GPS_IC 20 uses the DATAREADY signal to return a "SLEEP command response" notification to the processor 10 (t15). At this time, the GPS_IC 20 is in a SLEEP state, and therefore I2C communications are not used.

At time t18, when the SYS_SLEEP signal transitions from the LOW level to the HIGH level, the GPS_IC 20 starts receiving GPS signals. Then, at time t19 the GPS_IC 20 uses the DATAREADY signal to send a "position update" notification to the processor 10.

Moreover, the processor 10 also starts up the GPS_IC 20 when a distance calculated with the acceleration sensor 31 approaches a distance set for auto-laps, when the magnetic sensor 33 detects a turn, when a lap operation is performed by way of user operation, and upon a restart following a stop operation.

As described above, the electronic timepiece 100b of the present embodiment utilizes intermittent reception, in which GPS positional information is received intermittently. Here, upon detecting a turn via the magnetic sensor 33, the processor 10 of the electronic timepiece 100b switches the GPS_IC 20 from a suspended state to an active state. Moreover, the GPS_IC 20 of the electronic timepiece 100b stores logs in the non-volatile log memory 41 and stores firmware data and map data in the non-volatile map memory 42.

Modification Examples

The present invention is not limited to the embodiments described above, and modifications such as the following can be made, for example.

(1) The mobile electronic device of Embodiments 1 and 2 above was described as being an electronic timepiece as an example but may alternatively be a smartphone. In this case, the map screens in FIGS. 7 and 8 are displayed on the device itself.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A mobile electronic device, comprising:
    a Global Positioning System (GPS) receiver that detects a current positional information of the mobile electronic device at prescribed time intervals;
    an acceleration sensor; and
    a processor,
    wherein the processor is configured to perform the following:
        periodically determining that whether or not the mobile electronic device is moving using the GPS receiver and the acceleration sensor, and setting a flag indicating whether or not the mobile electronic device is moving every time said determination is made;
        determining whether the mobile electronic device is linearly moving; and
        storing the current positional information detected by the GPS receiver in a memory if the flag indicates that the mobile electronic device is moving when the GPS receiver detects the current positional information and if either a time that has elapsed since a previous detection of the current positional information is determined to be longer than a predetermined time interval, or the mobile electronic device has been determined to be linearly moving more than or equal to a predetermined number of times, and
    wherein the processor is configured not to store the current positional information detected by the GPS receiver in the memory even if the flag indicates that the mobile electronic device is moving when the GPS receiver detects the current positional information, if the time that has elapsed prescribed time has not passed since the previous detection of the current positional information has not been greater than the predetermined time interval and if the mobile electronic device has been determined to be linearly moving less than the predetermined number of times for a time period longer than said another prescribed time.

2. The mobile electronic device according to claim 1, wherein the processor is configured to determine whether the mobile electronic device is linearly moving by using an angle calculated from a latitude and a longitude between two points detected by the GPS receiver.

3. The mobile electronic device according to claim 1, wherein the processor is configured to determine whether or not the mobile electronic device is moving using the GPS receiver and the acceleration sensor, and if the GPS receiver determines that the mobile electronic device is moving, the processor determines that the mobile electronic device is moving even if the acceleration sensor determines that the mobile electronic device is not moving.

4. An electronic timepiece comprising:
    the mobile electronic device as set forth in claim 1; and
    a display unit that displays time, controlled by the processor in the mobile electronic device.

5. The mobile electronic device according to claim 1, wherein the processor is configured to store the current positional information detected by the GPS receiver in the memory if the flag indicates that the mobile electronic device is moving when the GPS receiver detects the current positional information and if the mobile electronic device is determined to be not linearly moving.

6. A positional information storing method performed by a processor of a mobile electronic device that includes, in addition to the processor, a Global Positioning System (GPS) receiver that detects a current positional information of the mobile electronic device at prescribed time intervals and an acceleration sensor, the method comprising, via said processor;
    periodically determining that whether or not the mobile electronic device is moving using the GPS receiver and the acceleration sensor, and setting a flag indicating whether or not the mobile electronic device is moving every time said determination is made;
    determining whether the mobile electronic device is linearly moving;
    storing the current positional information detected by the GPS receiver in a memory if the flag indicates that the mobile electronic device is moving when the GPS receiver detects the current positional information and if either a time that has been elapsed since a previous detection of the current positional information is determined to be longer than a predetermined time interval, or the mobile electronic device has been determined to be linearly moving more than or equal to a predetermined number of times; and
    not storing the current positional information detected by the GPS receiver in the memory even if the flag indicates that the mobile electronic device is moving when the GPS receiver detects the current positional information, if the time that has elapsed since the previous detection of the current positional information has not been greater than the predetermined time interval and if the mobile electronic device has been determined to be linearly moving less than the predetermined number of times.

7. The positional information storing method according to claim 6, further comprising, via said processor, storing the current positional information detected by the GPS receiver in the memory if the flag indicates that the mobile electronic device is moving when the GPS receiver detects the current positional information and if the mobile electronic device is determined to be not linearly moving.

8. A computer readable non-transitory storage medium storing a program that is readable by a processor of a mobile electronic device that includes, in addition to the processor, a Global Positioning System (GPS) receiver that detects a current positional information of the mobile electronic device at prescribed time intervals and an acceleration sensor, the program instructing said processor to perform the following;
   periodically determining that whether or not the mobile electronic device is moving using the GPS receiver and the acceleration sensor, and setting a flag indicating whether or not the mobile electronic device is moving every time said determination is made;
   determining whether the mobile electronic device is linearly moving;
   storing the current positional information detected by the GPS receiver in a memory if the flag indicates that the mobile electronic device is moving when the GPS receiver detects the current positional information and if either a time that has been elapsed since a previous detection of the current positional information is determined to be longer than a predetermined time interval, or the mobile electronic device has been determined to be linearly moving more than or equal to a predetermined number of times; and
   not storing the current positional information detected by the GPS receiver in the memory even if the flag indicates that the mobile electronic device is moving when the GPS receiver detects the current positional information, if the time that has elapsed since the previous detection of the current positional information has not been greater than the predetermined time interval and if the mobile electronic device has been determined to be linearly moving less than the predetermined number of times.

9. The storage medium according to claim 8, wherein the program instructs said processor to further perform storing the current positional information detected by the GPS receiver in the memory if the flag indicates that the mobile electronic device is moving when the GPS receiver detects the current positional information and if the mobile electronic device is determined to be not linearly moving.

* * * * *

UNITED STATES PATENT AND TRADEMARK OFFICE
CERTIFICATE OF CORRECTION

| | | |
|---|---|---|
| PATENT NO. | : 12,287,414 B2 | Page 1 of 1 |
| APPLICATION NO. | : 18/114765 | |
| DATED | : April 29, 2025 | |
| INVENTOR(S) | : Yuuki Oshita | |

It is certified that error appears in the above-identified patent and that said Letters Patent is hereby corrected as shown below:

In the Claims

Column 12, Line 6, Claim 1, the text "the time that has elapsed prescribed time has not passed" should be changed to -- the time that has elapsed --.

Column 12, Lines 11 and 12, Claim 1, the text "predetermined number of times for a time period longer than said another prescribed time." should be changed to -- predetermined number of times. --.

Signed and Sealed this
Tenth Day of June, 2025

Coke Morgan Stewart
*Acting Director of the United States Patent and Trademark Office*